Aug. 22, 1967  A. J. GEDDINGS  3,336,610
SANITARY PADDED CUSHIONS
Filed Oct. 21, 1965
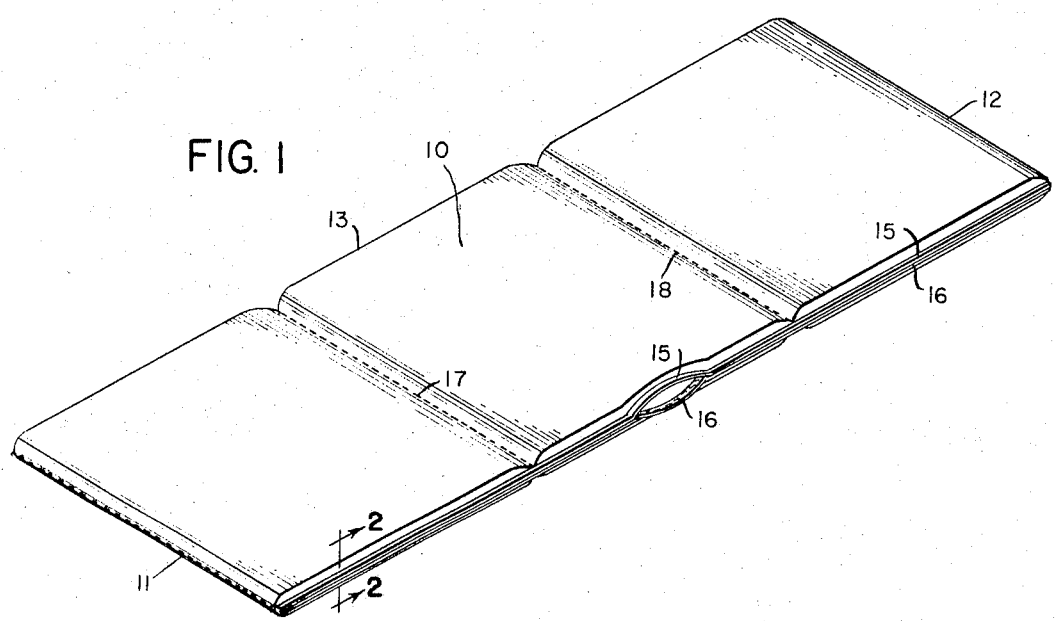
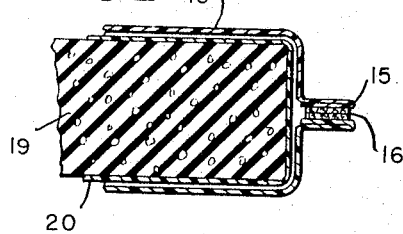
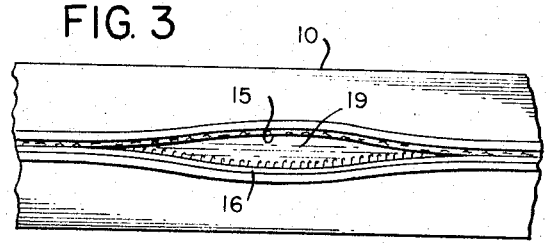
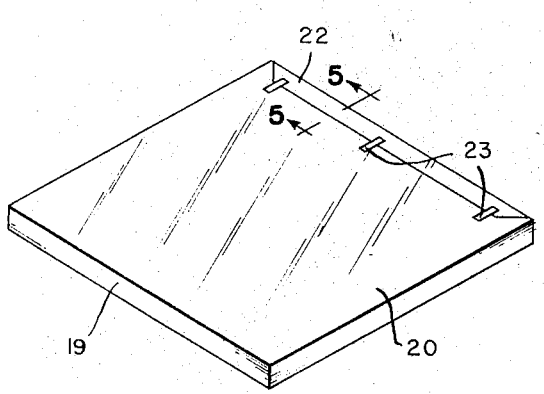
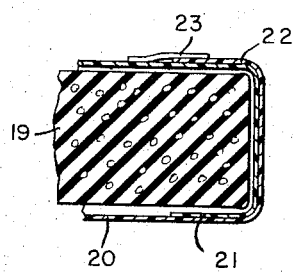
INVENTOR
ARTHUR J. GEDDINGS
BY
ATTORNEY

United States Patent Office 3,336,610
Patented Aug. 22, 1967

3,336,610
SANITARY PADDED CUSHIONS
Arthur Joseph Geddings, 27 Pine Drive,
Myrtle Beach, S.C. 29577
Filed Oct. 21, 1965, Ser. No. 500,380
1 Claim. (Cl. 5—344)

ABSTRACT OF THE DISCLOSURE

A sanitary padded waterproof cushion for use around bathing areas, and comprised of a generally flat container transversely connected to define multiple compartments, each with an opening along its edge less than the length of such edge and connected throughout its length by a hook pile fastener permitting quick opening and closing, a filler cushion in each compartment larger when extended than the opening into the compartment, said filler cushion being encased in a waterproof envelope and allowing the opposed portions of the openings to be separated to afford ready access to the compartment to allow the filler cushion with its waterproof envelope to be collapsed, inserted and extended, and thereafter the opening closed.

---

This invention relates to a sanitary padded cushion and has for its object the provision of a cushion comprised of a hollow container with one or more compartments each having an opening of reduced size for the insertion and removal of a filler cushion of foam rubber or the like with a waterproof covering, such opening being provided with a hook pile type of fastener which can be quickly closed by pressing the cooperating portions together and readily opened by pulling them apart to permit the filler cushion to be removed and replaced, and the hollow container and the covering for the filler cushion providing a double waterproof covering over the filler cushion to protect the same.

Other objects and advantages of the invention will be apparent from the following description and the accompanying drawing wherein:

FIG. 1 is a perspective of a three part padded cushion illustrating one embodiment of the invention;

FIG. 2, an enlarged fragmentary detailed section on the line 2—2 of FIG. 1;

FIG. 3, an enlarged fragmentary elevation illustrating the opening into the hollow container with the hook pile closure therefore;

FIG. 4, a perspective of the cushion filler with its protective sheath; and

FIG. 5, an enlarged fragmentary detailed section on the line 5—5 of FIG. 4 illustrating the adhesive closure strip.

Briefly stated, the present invention is a sanitary padded cushion composed of a moisture proof casing or jacket containing core or filler of foam rubber or other substance with each core or filler encased in a waterproof bag of polyethylene or other substance open on one side and with material of said opening folded over, pressed together and fastened by means of adhesive strips, such encased core or filler being received in a pocket in the casing having a hook pile quickly detachable opening so that when closed, moisture is excluded and if any moisture should get into the casing it would be prevented from reaching the core or filler by the waterproof bag in which the latter is contained.

With continued reference to the drawing, the cushion of the present invention is comprised of an outside envelope or double-walled casing 10 of waterproof material folded upon itself and stitched together at its ends 11 and 12 and along one side edge 13 and also stitched together along its opposite edge except for an unstitched portion 15 of its length. The opening 15 is provided with a hook pile quick detachable fastener 16 which openings 15 affords ready access to the multiple compartments defined by cross stitching 17 and 18, three of such compartments being illustrated in FIG. 1, although the invention contemplates a single or any desired number of compartments.

Within the casing or container 10 in each of the compartments is disposed a core or filler cushion 19 encased in a waterproof bag 20 having overlapping flaps 21 and 22 fastened together by means of adhesive strips 23 so that the cushion 19 is protected from moisture. The cushion is further protected due to the waterproof character of the material of the container 10 in which it is located and due to the fact that each compartment is substantially air tight yet readily accessible through the hook pile quick detachable connection in the opening 15.

It will be apparent from the foregoing that a padded cushion is provided which can be used around bathing or other areas where there is abundant moisture and can be used to support persons sitting or reclining in wet bathing suits or other clothing with the core or filler cushion doubly protected by the material of the flexible container and by the waterproof polyethylene bag allowing a quick and efficient access to the core or filler without damage thereto without the use of special tools or equipment. Also the cushion can be used without the padding or core becoming wet or soggy or moldy with the cleaning and airing of the core capable of being done by unskilled persons without damage to the article.

What is claimed is:

A sanitary padded cushion of the kind to be sat upon and reclined against around bathing areas by a person in a wet bathing suit without said cushion absorbing moisture, said cushion comprising a generally flat container of waterproof flexible sheet material having its edges sealed together and transversely connected defining multiple compartments and along which transversely connected portions the container can be folded to allow flat areas to be disposed in generally parallel relation, thereby reducing the over-all length and breadth of the container, each of said multiple compartments having an opening along one edge less than the length of said edge, hook pile fastening means for securing each opening closed and substantially sealed against the casual passage of moisture therethrough and thereby providing a substantially water-tight compartment, a filler cushion in each compartment of greater size when extended than the opening into said compartment, a waterproof envelope enclosing said filler cushion, whereby the opposed portions of the opening can be separated to afford access to said compartment to allow said filler cushion to be collapsed, inserted and extended and thereafter the opening closed.

References Cited

UNITED STATES PATENTS

| 2,834,970 | 5/1958 | Nappe | 5—344 |
| 2,895,146 | 7/1959 | Lester | 5—339 |
| 2,942,281 | 6/1960 | Cole | 5—341 |
| 3,121,886 | 2/1964 | Seymour | 5—341 X |

FOREIGN PATENTS 159,299  2/1921  Great Britain.

DAVID J. WILLIAMOWSKY, *Primary Examiner.*

A. CALVERT, *Assistant Examiner.*